United States Patent
Goel et al.

(10) Patent No.: US 9,886,498 B2
(45) Date of Patent: *Feb. 6, 2018

(54) TITLE STANDARDIZATION

(71) Applicant: Microsoft Technology Licensing, LLC, Redmond, WA (US)

(72) Inventors: Arpit Amar Goel, Palo Alto, CA (US); Uri Merhav, Rehovot (IL); Vitaly Gordon, Mountain View, CA (US); Kin Fai Kan, Sunnyvale, CA (US); Craig Martell, San Juan Bautista, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 476 days.

This patent is subject to a terminal disclaimer.

(21) Appl. No.: 14/523,357

(22) Filed: Oct. 24, 2014

(65) Prior Publication Data

US 2016/0117385 A1    Apr. 28, 2016

(51) Int. Cl.
*G06F 17/30* (2006.01)
*G06Q 50/00* (2012.01)
*G06Q 10/10* (2012.01)
*G06F 17/27* (2006.01)

(52) U.S. Cl.
CPC ...... *G06F 17/30684* (2013.01); *G06F 17/277* (2013.01); *G06F 17/30303* (2013.01); *G06Q 10/10* (2013.01); *G06Q 50/01* (2013.01)

(58) Field of Classification Search
CPC ........ G06F 17/30303; G06F 17/30864; G06Q 10/10

USPC .......................................................... 707/749
See application file for complete search history.

(56) References Cited

U.S. PATENT DOCUMENTS

| 6,078,935 | A | * | 6/2000 | Nielsen | 715/207 |
| 9,342,592 | B2 | * | 5/2016 | Giverts et al. | 707/737 |
| 2013/0018900 | A1 | * | 1/2013 | Cheng et al. | 707/755 |
| 2013/0232171 | A1 | * | 9/2013 | Cheng et al. | 707/771 |
| 2014/0081995 | A1 | * | 3/2014 | Martin et al. | 707/750 |
| 2014/0164416 | A1 | * | 6/2014 | Hosseini et al. | 707/758 |
| 2015/0032747 | A1 | * | 1/2015 | Giverts et al. | 707/737 |
| 2016/0196266 | A1 | * | 7/2016 | Merhav et al. | 705/319 |

OTHER PUBLICATIONS

Shuo Chang et al., Competition over timeline in social networks, 2013, IEEE, 494-501.*

* cited by examiner

*Primary Examiner* — Jean B Fleurantin
(74) *Attorney, Agent, or Firm* — Schwegman Lundberg & Woessner, P.A.

(57) ABSTRACT

A title standardization system is may be configured to detect an edit operation associated with the job title field of a member profile stored by an on-line social network system and, in response, perform operations to derive a canonical title that represents a raw title string found in the job title field. The derived canonical title may be then associated with the member profile, in which the originally-obtained subject title string was found. This association may be stored in a database for future use, e.g., for targeting job recommendations, recruiting, making professional contacts, as well as for other purposes.

18 Claims, 5 Drawing Sheets

TITLE STANDARDIZATION

TECHNICAL FIELD

This application relates to the technical fields of software and/or hardware technology and, in one example embodiment, to system and method to determine canonical titles that represent a title string in an on-line social network system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to determine canonical titles that represent a raw title string in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). A member profile may be associated with social links that indicate the member's connection to other members of the social network. A member profile may also include or be associated with comments or recommendations from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills. Information about a member's professional skills may be referred to as professional attributes. Professional attributes may be maintained in the on-line social network system and may be used in the member profiles to describe and/or highlight professional background of a member. Some examples of professional attributes (also referred to as merely attributes, for the purposes of this description) are strings representing professional skills that may be possessed by a member (e.g., "product management," "patent prosecution," "image processing," etc.). Thus, a member profile may indicate that the member represented by the profile is holding himself out as possessing certain skills.

The profile of a member may also include information about the member's current and past employment, such as company names and professional titles, also referred to as job titles. An on-line social network system may store a great number of raw titles, as members (also referred to as users) may be permitted to input any description into a field (e.g., referred to as a job title field) allocated in their respective member profiles for data that is meant to describe their jobs. Some users may be reasonable and input raw titles such as "a patent attorney," or "a data scientist," etc. Other users, however, may input title strings that may make it hard to automatically determine the job function associated with the title. Some users may include superfluous or extraneous information into the title field of their profile. For example, while there may be a designated field in a member profile for a company name, a user may list, as their job title, "data scientist at yahoo.com." Thus, it may be beneficial to have a technique for automatically determining a canonical title associated with a member profile, which corresponds to a raw title string that may include noise in addition to the terms that specifically represent a job title.

In one example embodiment, method and system to determine canonical titles that represent a raw title string may be utilized beneficially to derive, from a raw title string that appears in a member profile the way it was entered by the member, a concise phrase that accurately identifies the job described by the raw title string. For the purposes of this description, such concise string may be referred to as a canonical title. A raw title string may also be referred to as a subject title string as it may be the subject of examination in the process of determining a corresponding canonical title. A system to determine canonical titles that represent respective raw title strings may also be termed a title standardization system.

A title standardization system may be configured to detect an edit operation associated with the job title field of a member profile and obtain the string from the job title field in order to examine it and process. A title standardization system may then identify what's called a core part of the title string, which is the portion of the subject title string distilled by removing any extraneous words that typically appear at the beginning and/or at the end of a raw title string and are often unrelated to the job function associated with the title but, instead, may be related to seniority, geographic location and, perhaps, company name. The extraneous words that may appear at the beginning of a raw title string are referred to as a prefix. The extraneous words that may appear at the beginning of a raw title string are referred to as a prefix. A title standardization system may examine just the core part of the title string (which may be termed a core title) to derive a canonical title. The derived canonical title may be then associated with the member profile, in which the originally-obtained subject title string was found. This association may be stored in a database for future use, e.g., for targeting job recommendations, recruiting, making professional contacts, as well as for other purposes.

The derived canonical title may be stored in a dictionary of canonical titles. In one embodiment, an entry in the dictionary of canonical titles comprises a title string and a count indicative of a number of raw title strings in the member profiles that have been mapped to that title string. The dictionary may be periodically updated so that it reflects changes in the universe of member profiles in the on-line social network system.

The process of deriving a canonical title from a subject string (either from a raw title string or from a core title) may involve calculating various conditional probabilities with respect to words that appear in the subject string. Conditional probabilities may be calculated with respect to a corpus of title strings (that may include all or a subset of raw title strings stored in the on-line social network system) and may include values, such as a value reflecting the frequency of occurrence of two words together, a value reflecting the frequency with which a phrase occurs in the corpus of title strings, probability that a certain phrase is a complete stand-alone job title, etc. For example, if a subject string is "a software rocket engineer," a title standardization system may be able to recognize, based on the calculated conditional probabilities, that the word "rocket" almost never appears after the word "software," while the word "engineer" appears very frequently after the word "software" in the title strings stored in the on-line social network system. Based on this information, the title standardization system may infer that the word "rocket" may be omitted, leaving the phrase "software engineer" to be the selected canonical title.

In operation, title standardization system examines a raw title string to identify so-called parts of title, where each part of title may be related to a particular type of information. For example, a raw title string may be parsed into a prefix/core/suffix triplet, where the prefix is related to seniority, the core part of the title is related to the job function, and the suffix that appears at or near the end of the raw title string is related to the geographic location information. An example representation that comprises these three parts—a prefix, a core, and a suffix—of a raw title string "executive SVP of human resources @ Yahoo.com" obtained from a subject profile is shown below as Example (1).

Example (1)

[PREFIX: executive senior] [Core: vp of hr yahoo.com] [SUFFIX: empty]

Another example, the representation that comprises these three parts of a raw title string "senior data scientist at yahoo.com" is shown below as Example (2).

Example (2)

[PREFIX: senior] [Core: data scientist at yahoo.com] [SUFFIX: empty]

It will be noted that either or both of the prefix and the suffix parts of title may be represented by an empty or a null string. The processing of a raw title string my include applying hardcoded expansion rules to remove capitalization and expand common acronyms, as well as to identify prefix and suffix modifier words at the start and at the end of the title string respectively. The prefix and suffix modifier words may be identified based on examining entries in the previously compiled dictionary of such modifier words. The string associated with the core part of a raw title string, a core title, may be analyzed to identify a canonical title, as described below.

In processing of a subject title string to identify a corresponding canonized job title, a title standardization system may utilize a so-called n-gram language model, which may be constructed to evaluate respective frequencies of occurrence and co-occurrence, as well as conditional probabilities for n-grams that appear in a subject title. Canonization of a given subject title may involve extracting n-grams from the subject title and, for every extracted n-gram, calculating frequency of occurrence value and one or more conditional probabilities with respect to a corpus of title strings selected from title strings stored in the on-line social network system. An n-gram will be understood as a set of n items from a given sequence of text.

An n-gram language model may be utilized to learn that a phrase, such as "VP of Engineering" is often a complete phrase, whereas "VP of" is almost never a complete phrase. In other words, an n-gram language model may provide an objective way to ascertain what might be a reasonable job title, where a reasonable job title is a title string that often appears in the dataset of title strings as a complete phrase and rarely appears as an incomplete phrase and is also ubiquitous to some extent. In one embodiment, an n-gram language model may be configured to reject those n-grams that do not appear often enough in the dataset of title strings. With reference to the Example (1) above, some of the n-grams extracted from the core title identified for the subject profile ("vp of hr yahoo.com") include strings "vp of," "hr yahoo.com," and "vp of hr."

In one embodiment, the frequency of occurrence value for an n-gram reflects the frequency, with which the n-gram appears in the learning corpus of job titles that are stored in member profiles associated with the same industry as an industry associated with the subject profile. An n-gram language model may calculate conditional probability of the subject n-gram being followed by the <end> token. The <end> token may be used to indicate the end of the subject core title. For instance, this conditional probability value may indicate what percentage of the time, of all the times the term "vp of" appears in the corpus, it is followed by some other word, as opposed to being followed by the <end> token. Another conditional probability value may indicate probability of the n-gram being preceded by the <start> token (that indicates the beginning of the subject core title) and also being followed by the <end> token. Based on the calculated respective frequencies of occurrence and the conditional probabilities, the model may select an n-gram that is deemed to provide the best description of the member's job and identify the selected n-gram as a canonical title that corresponds to the raw title string.

In one example embodiment, each n-gram extracted from a subject title string may be assigned scores corresponding to results of comparisons of calculated respective frequencies of occurrence and the conditional probabilities with respective thresholds, and the model may select the highest-scoring n-gram as the canonical title. Provided two or more n-grams have the same score, the longest n-gram may be selected as the canonical title. Alternatively, the selection of an n-gram may be based on one of the scores, while the other scores may be used to exclude an n-gram from the consideration for the canonical title. With reference to the Example (1) above, the string "vp of hr" would be selected as the canonical title that corresponds to the subject title string. The canonical title determined as the result of applying an n-gram language model to the raw title string may be then associated with the subject member profile, and the association may be stored in a database for future use.

As mentioned above, a title standardization system may be configured to generate a dictionary of canonical titles, where canonical titles are derived from raw title strings stored by the on-line social network system. The raw titles stored by the on-line social network system may be analyzed as described below. First, any known abbreviations that appear in a raw title string—termed a subject title string as it is the subject of the analysis—are expanded into complete words or phrases. A title standardization system may represent the subject title string as a string that includes the <start> and <end> symbols, where the <end> token indicates the end of the subject title string and the <start> token indicates the beginning of the subject title string. Next, a title standardization system extracts one or more n-grams from the subject title string and identifies at least one of the n-grams as a standardized title. An n-gram may include the <start> and/or the <end> symbols.

Given the word w1 from a subject title string (which could be the <start> symbol) and the word w2 that immediately follows w1 in the subject title string, the following values are calculated. P(w2|w1), which is conditional probability of w2 occurring given w1 occurs. This value is computed as the number of times w2 occurs after w1, divided by the number of times some other word (designated as X) occurs after w1, which is expressed by Formula (1) below.

$$P(w2|w1) = \#(w1,w2) \text{ counts}/\#(w1,X) \text{ counts, where } X \text{ could be any word.} \quad \text{Formula (1)}$$

A branching factor (branchingFactor(w)) is defined as the number of unique words that occur after the word w, including the <end> symbol. Then we made the following two decisions:

A determination of whether the (w1,w2) sequence of words is to be treated as a standardized title is based on whether the conditional probability of w2 occurring given w1 occurs is greater than the branching factor and also based on whether w2 indicates the end of a valid title. These conditions may be expressed by Formula (2) and Formula (3) below.

$$P(w2|w1) > \text{branchingFactor}(w1) \quad \text{Formula (2)}$$

$$P(<\text{end}>|w2) > \text{branchingFactor}(w2) \quad \text{Formula (3)}$$

This algorithm essentially treats a member entering her title as a Bayesian player who makes a mistake (e.g., by entering a wrong spelling or a non-important word into the field of the member profile that is designated for the job title information) with probability that is lower than the branching factor of the given word.

Thus determined standardized title may be included into a dictionary of canonical titles, which may be stored in a database. An entry in the dictionary of standardized titles may include a title string, a count indicating the number of raw titles that correspond to and are mapped to the given standardized title. The dictionary of canonical titles may be periodically updated so that it reflects changes in the universe of member profiles in the on-line social network system. An example title standardization system may be implemented in the context of a network environment 100 illustrated in FIG. 1.

Figure 1:
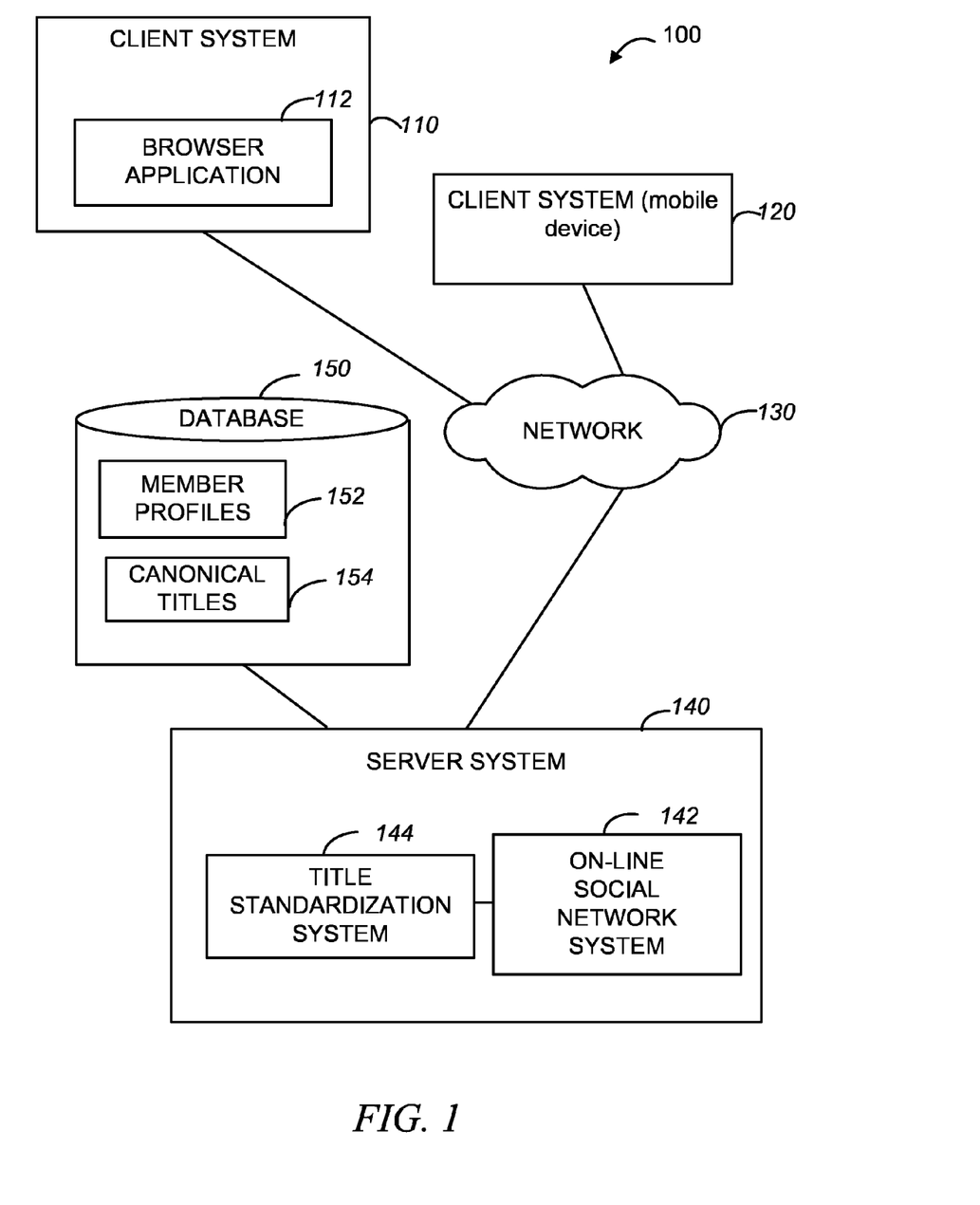
FIG. 1 is a diagrammatic representation of a network environment within which an example method and system to determine canonical titles that represent a raw title string may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a title standardization system 144. The title standardization system 144 may be configured to derive canonical titles that represent respective raw title strings stored in the member profiles 152 maintained in the on-line social networking system 142.

As explained above, the title standardization system 144 may be configured to detect an edit operation associated with the job title field of a member profile and obtain the string from the job title field in order to examine it and process. The title standardization system 144 may then identify a core part of the title string and examine the core part of the title string to derive a canonical title. The derived canonical title may be then associated with the member profile, in which the originally-obtained subject title string was found. This association may be stored in the database 150 for future use, e.g., for targeting job recommendations, recruiting, making professional contacts, as well as for other purposes. The title standardization system 142 may also be configured to generate a dictionary of canonical titles, as described above. The dictionary of canonical titles may be stored in the database 150 as canonical titles 154. The title standardization system 144 may periodically update the dictionary 154.

The title standardization system 144 may associate profiles in the on-line social network system with respective canonical titles. A canonical title associated with a member profile may be used to match that member profile with various job postings in the on-line social network 142. An example title standardization system 144 is illustrated in FIG. 2.

Figure 2:
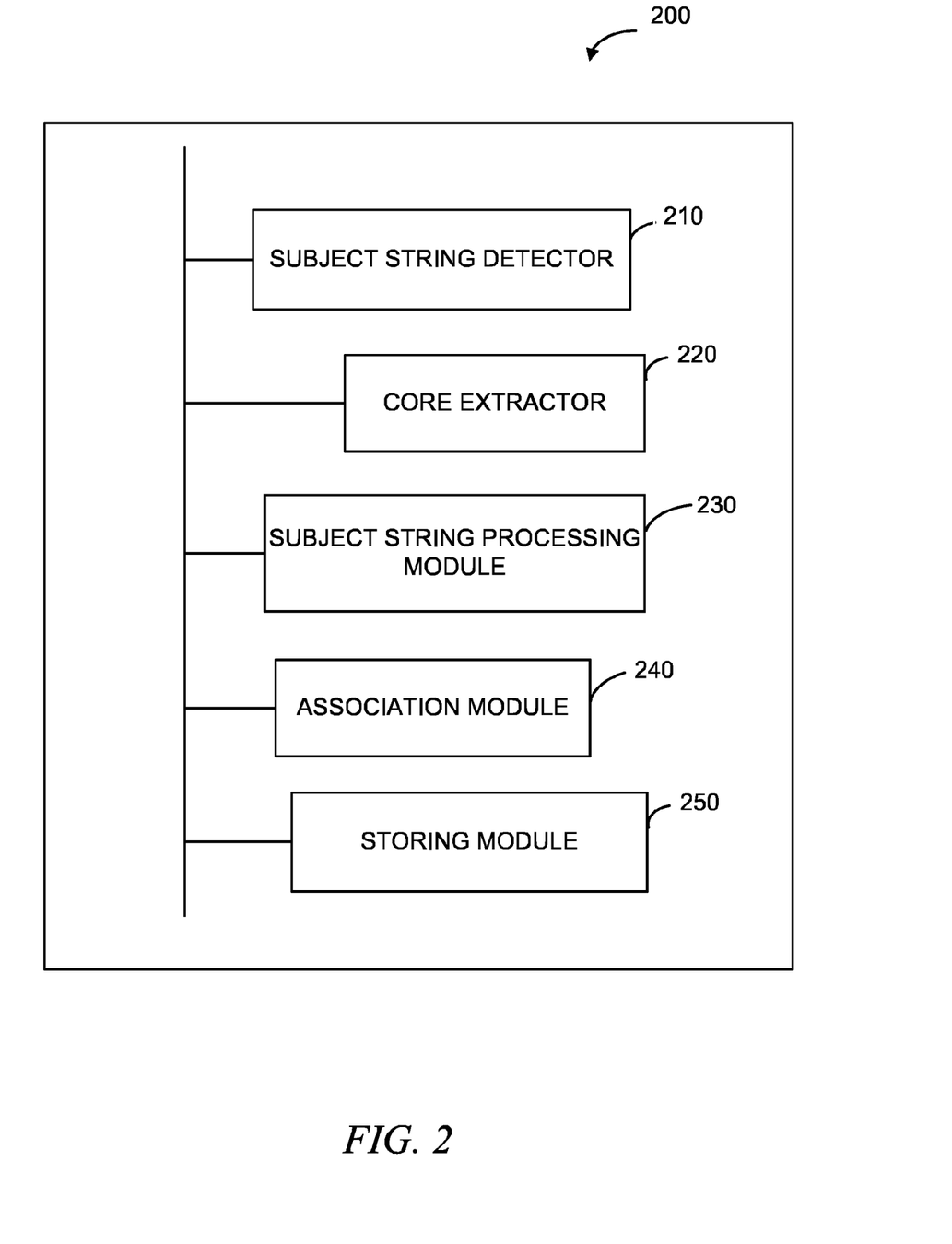
FIG. 2 is block diagram of a system to determine canonical titles that represent a raw title string, in accordance with one example embodiment.

FIG. 2 is a block diagram of a system 200 to derive canonical titles from title strings found in member profiles maintained by the on-line social networking system 142 of FIG. 1. As shown in FIG. 2, the system 200 includes a subject string detector 210, a core extractor 220, and a subject string processing module 230. The subject string detector 210 may be configured to detect a raw title string in a subject profile. The detecting of a raw title string in a subject profile may be triggered by an edit operation with respect to the subject profile or by the operation of creating a new profile (the subject profile) in the on-line social network system 142 of FIG. 1. The core extractor 220 may be configured to represent the raw title string detected by the subject string detector 210 as a triplet comprising a prefix, a core, and a suffix. As explained above, the core includes a string termed a core string, while one of or both of the prefix and the suffix may include just an empty or NULL string.

The subject string processing module 230 may be configured to derive, from a subject string (which may be a core string) a canonical title. In order to derive a canonical title from a subject string, the subject string processing module 230 may extract one or more phrases from the subject string and, for each extracted phrase, calculate frequency of occurrence of a phrase in respective job title fields in a subject set of member profiles from the member profiles, and also calculate one or more conditional probability values with respect to respective phrases. The one or more conditional probability values may be indicative of probability of a phrase being a complete stand-alone job title. For example, respective conditional probability values may indicate that a phrase, such as "VP of Engineering" is often a complete stand-alone job title, whereas "VP of" is almost never a complete stand-alone job title. Based on the calculated frequency of occurrence for a phrase and the calculated conditional probability values for that phrase, as compared to frequency of occurrence and one or more conditional probability values calculated for other phrases from the extracted phrases, the subject string processing module 230 may designate a phrase as the canonical title.

Various values that the subject string processing module 230 may calculate for a phrase extracted from a subject string may include the following values:

conditional probability of the last word in the phrase being the last word in a job title, with respect to job titles stored in the subject set of member profiles, conditional probability of the first word in the phrase being the first word in a job title and the last word in that phrase being the last word in a job title, with respect to job titles stored in the subject set of member profiles, a branching factor for a first word in the extracted phrase, the branching factor reflecting a number of unique words that occur after the first word in job titles stored in the subject set of member profiles, and probability of co-occurrence of the first word and a second word in the extracted phrase.

The subject string processing module 230 may be configured to compare the branching factor and the probability of co-occurrence of the first word and the second word and, based on the result of comparison, determine whether the words in the phrase should be included into a canonical title. The calculating of the probability of co-occurrence of the first word and the second word in the extracted phrase, in one example embodiment, comprises determining a first value comprising a number of instances of the second word occurring subsequent to the first word in the subject set of member profiles, determining a second value comprising a number of instances of any other word occurring subsequent to the first word in the subject set of member profiles, and dividing the first value by the second value, which is expressed by Formula (1) discussed above. In one embodiment, the subject set of member profiles is associated with a particular industry.

Also shown in FIG. 2 are an association module 240 and a storing module 250. The association module 240 may be configured to generate an indication of association of the canonical title with the subject profile. The storing module 250 may be configured to store the indication of association of the canonical title with the subject profile in a database. The storing module 250 may also store the canonical title in a dictionary of canonical titles a database (e.g., in the database 150 of FIG. 1). As explained above an entry in the dictionary of canonical titles comprises a canonical title string and a count indicative of a number of raw title strings in the member profiles that have been mapped to that canonical title string. Some operations performed by the system 200 may be described with reference to FIG. 3.

Figure 3:
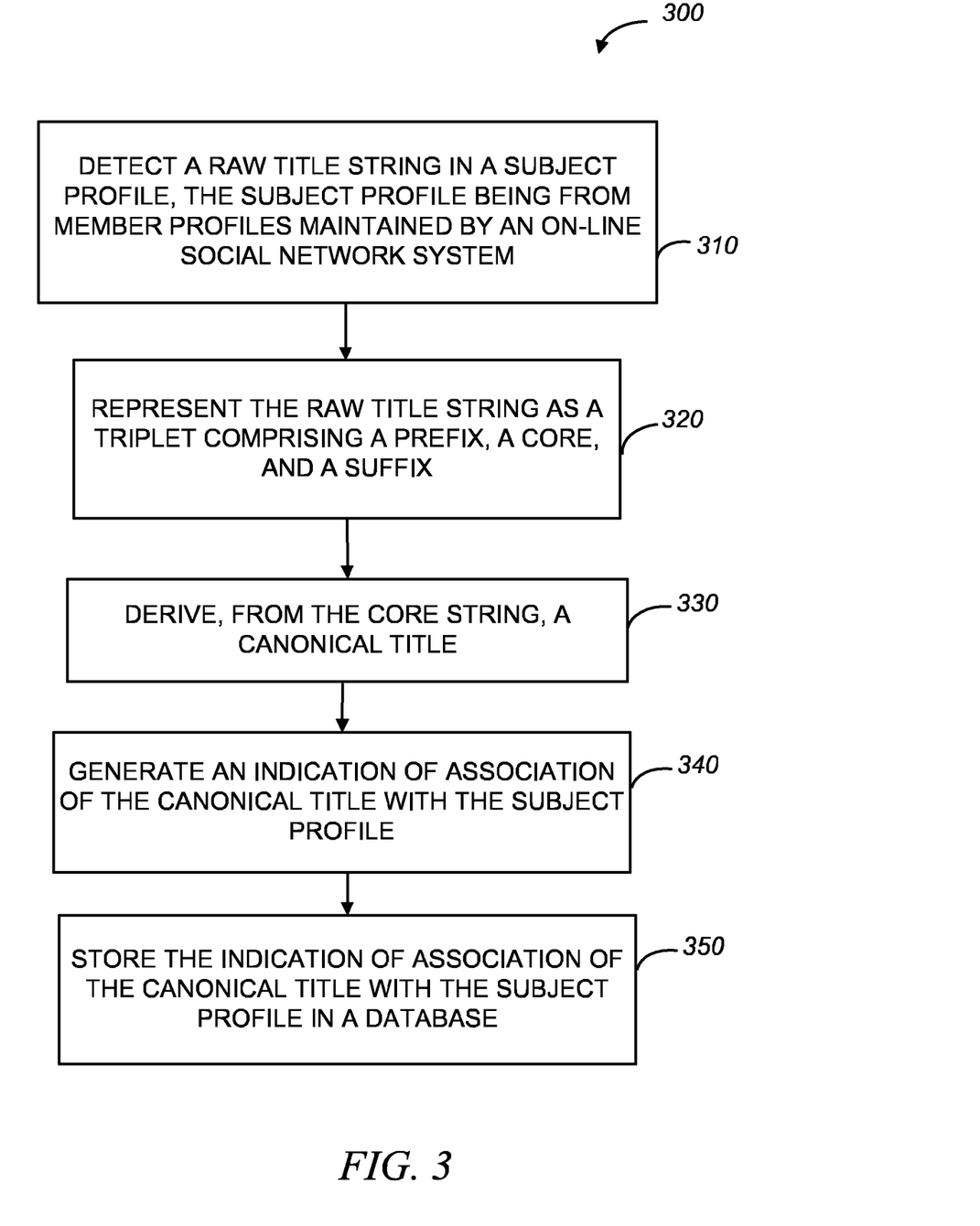
FIG. 3 is a flow chart illustrating a title standardization method, in accordance with an example embodiment.

FIG. 3 is a flow chart of a title standardization method 300 for deriving canonical titles from title strings found in member profiles maintained by the on-line social networking system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the subject string detector 210 of FIG. 2 detects of a raw title string in a subject profile. As explained above, the detecting may be triggered by an edit operation with respect to the subject profile or by the operation of creating a new profile (the subject profile) in the on-line social network system 142 of FIG. 1. At operation 320, the core extractor 220 of FIG. 2 represents the raw title string detected by the subject string detector 210 as a triplet comprising a prefix, a core, and a suffix. At operation 330, the subject string processing module 230 of FIG. 2 derives, from a subject string (which may be a core string) a canonical title. At operation 340, association module 240 of FIG. 2 generates an indication of association of the canonical title with the subject profile. The storing module 250 stores the indication of association of the canonical title with the subject profile in a database at operation 350.

Figure 4:
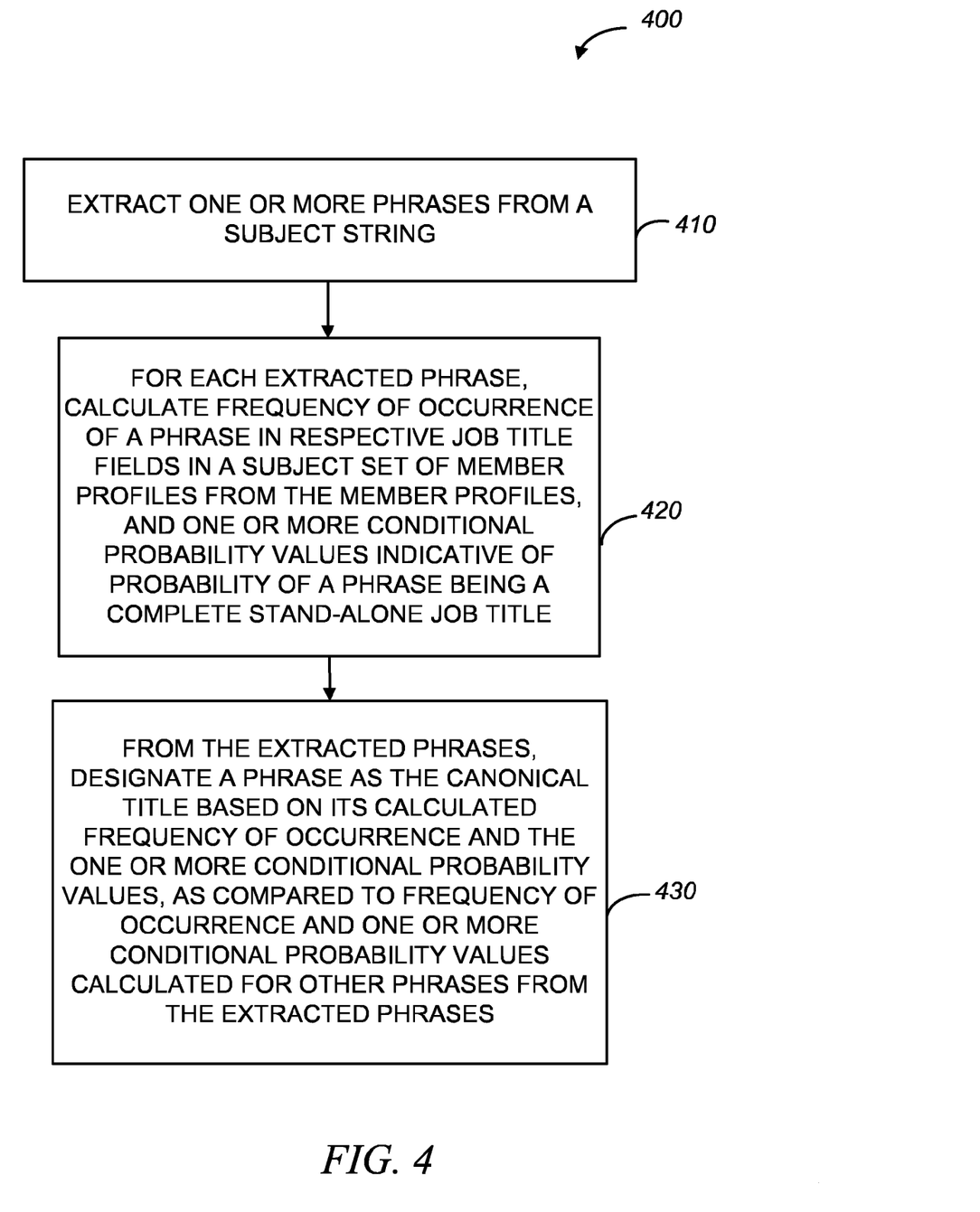
FIG. 4 is a flow chart of a method to determine canonical titles that represent a raw title string, in accordance with an example embodiment.

Some operations performed by the subject string processing module 230 of FIG. 2 may be described with reference to FIG. 4. FIG. 4 is a flow chart of a method 400 illustrating some specific operations performed in deriving canonical titles from title strings found in member profiles maintained by the on-line social networking system 142 of FIG. 1. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

At operation 410, the subject string processing module 230 of FIG. 2 extracts one or more phrases from the subject string. At operation 420, the subject string processing module 230 calculates frequency of occurrence of a phrase in respective job title fields in a subject set of member profiles from the member profiles, and also calculate one or more conditional probability values with respect to respective phrases. The one or more conditional probability values may be indicative of probability of a phrase being a complete stand-alone job title. At operation 430, designate a phrase as the canonical title, based on the calculated frequency of occurrence for a phrase and the calculated conditional probability values for that phrase, as compared to frequency of occurrence and one or more conditional probability values calculated for other phrases from the extracted phrases.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 5:
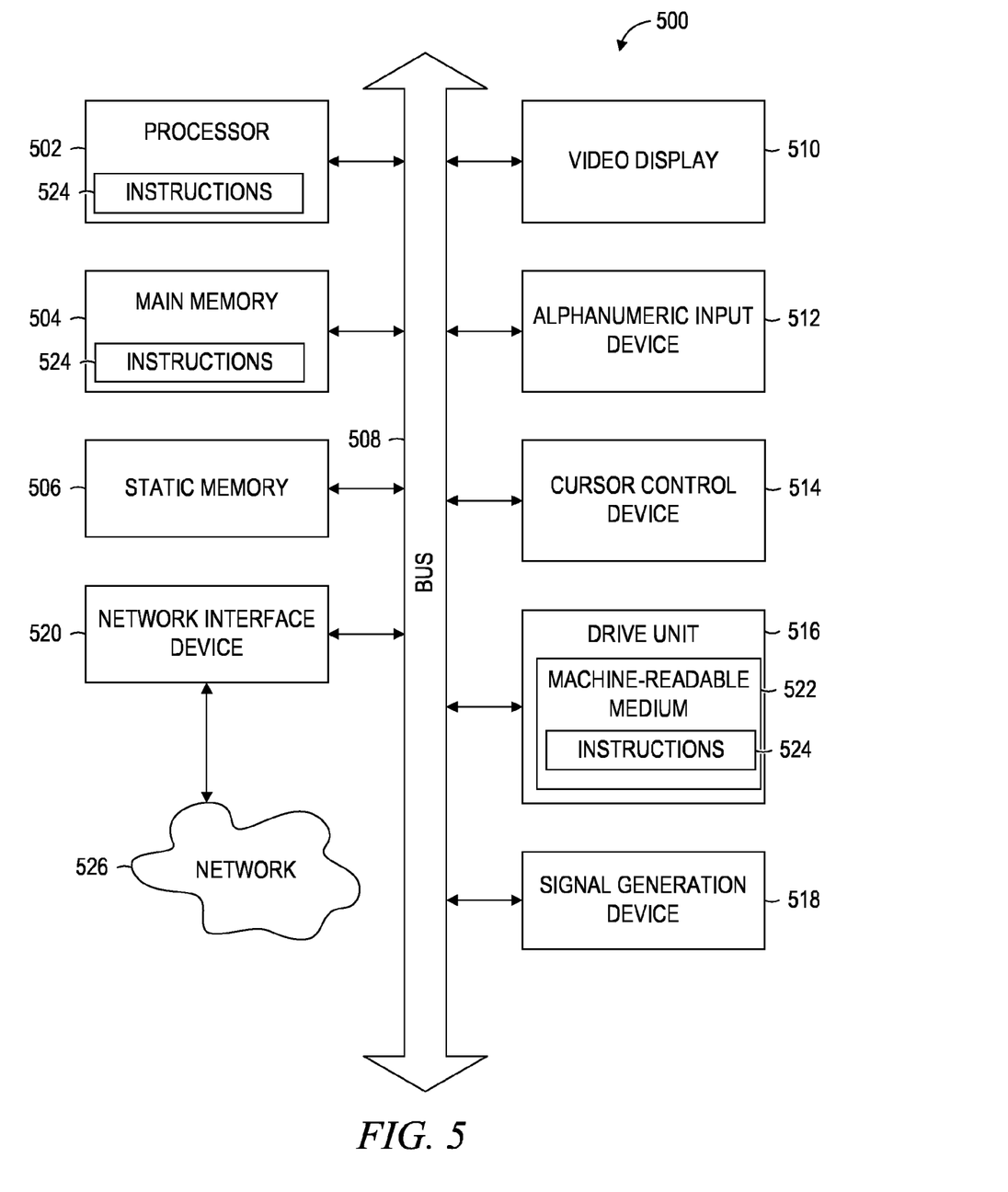
FIG. 5 is a diagrammatic representation of an example machine in the form of a computer system within which a set of instructions, for causing the machine to perform any one or more of the methodologies discussed herein, may be executed.

FIG. 5 is a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to derive canonical titles from raw title strings has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   detecting a raw title string in a subject profile, the subject profile being from member profiles maintained by an on-line social network system;
   representing the raw title string as a triplet comprising a prefix, a core, and a suffix, the core including a core string, the prefix including a non-empty or an empty string, the suffix including a non-empty or an empty string;
   deriving, using at least one processor, from the core string, a canonical title, wherein the deriving comprises:
      extracting one or more phrases from the core string,
      for each extracted phrase calculating frequency of occurrence of a phrase in respective job title fields in a subject set of member profiles from the member profiles and calculating one or more conditional probability values, the one or more conditional probability values indicative of probability of a phrase being a complete stand-alone job title, and from the extracted phrases designating a phrase as the canonical title based on frequency of occurrence calculated for that phrase and the one or more conditional probability values as compared to frequency of occurrence and one or more conditional probability values calculated for other phrases from the extracted phrases;

generating an indication of association of the canonical title with the subject profile; and storing the indication of association of the canonical title with the subject profile in a database.

2. The method of claim 1, wherein the one or more conditional probability values for a phrase extracted from the core string comprises probability of the last word in the phrase being the last word in a job title, with respect to job titles stored in the subject set of member profiles.

3. The method of claim 1, wherein the one or more conditional probability values for a phrase extracted from the core string comprises probability of the first word in the phrase being the first word in a job title and the last word in that phrase being the last word in a job title, with respect to job titles stored in the subject set of member profiles.

4. The method of claim 1, wherein the subject set of member profiles is associated with a particular industry.

5. The method of claim 1, wherein the calculating of the one or more conditional probability values for an extracted phrase comprises:
calculating a branching factor for a first word in the extracted phrase, the branching factor reflecting a number of unique words that occur after the first word in job titles stored in the subject set of member profiles;
calculating probability of co-occurrence of the first word and a second word in the extracted phrase; and
comparing the branching factor and the probability of co-occurrence of the first word and the second word.

6. The method of claim 5, wherein the calculating of the probability of co-occurrence of the first word and the second word in the extracted phrase comprises:
determining a first value comprising a number of instances of the second word occurring subsequent to the first word in the subject set of member profiles;
determining a second value comprising a number of instances of any other word occurring subsequent to the first word in the subject set of member profiles;
dividing the first value by the second value.

7. The method of claim 1, comprising storing the canonical title in a dictionary of canonical titles.

8. The method of claim 7, wherein an entry in the dictionary of canonical titles comprises a canonical title string and a count indicative of a number of raw title strings in the member profiles that have been mapped to that canonical title wing.

9. The method of claim 8, comprising updating, periodically, the dictionary of canonical titles.

10. A computer-implemented system comprising:
a subject string detector, implemented using at least one processor, to detect a raw title string in a subject profile, the subject profile being from member profiles maintained by an on-line social network system;
a core extractor, implemented using at least one processor, to represent the raw title string as a triplet comprising a prefix, a core, and a suffix, the core including a core string, the prefix including a non-empty or an empty string, the suffix including a non-empty or an empty string;
a subject string processing module, implemented using at least one processor, to derive, from the core string, a canonical title, wherein the deriving comprises:
extracting one or more phrases from the core string, for each extracted phrase calculating frequency of occurrence of a phrase in respective job title fields in a subject set of member profiles from the member profiles and calculating one or more conditional probability values, the one or more conditional probability values indicative of probability of a phrase being a complete stand-alone job title, and from the extracted phrases designating a phrase as the canonical title based on frequency of occurrence calculated for that phrase and the one or more conditional probability values as compared to frequency of occurrence and one or more conditional probability values calculated for other phrases from the extracted phrases;
an association module, implemented using at least one processor, to generate an indication of association of the canonical title with the subject profile; and
a storing module, implemented using at least one processor, to store the indication of association of the canonical title with the subject profile in a database.

11. The system of claim 10, wherein the one or more conditional probability values for a phrase extracted from the core string comprises probability of the last word in the phrase being the last word in a job title, with respect to job titles stored in the subject set of member profiles.

12. The system of claim 10, wherein the one or more conditional probability values for a phrase extracted from the core string comprises probability of the first word in the phrase being the first word in a job title and the last word in that phrase being the last word in a job title, with respect to job titles stored in the subject set of member profiles.

13. The system of claim 10, wherein the subject set of member profiles is associated with a particular industry.

14. The system of claim 10, wherein the calculating of the one or more conditional probability values for an extracted phrase comprises:
calculating a branching factor for a first word in the extracted phrase, the branching factor reflecting a number of unique words that occur after the first word in job titles stored in the subject set of member profiles;
calculating probability of co-occurrence of the first word and a second word in the extracted phrase; and
comparing the branching factor and the probability of co-occurrence of the first word and the second word.

15. The system of claim 14, wherein the calculating of the probability of co-occurrence of the first word and the second word in the extracted phrase comprises:
determining a first value comprising a number of instances of the second word occurring subsequent to the first word in the subject set of member profiles;
determining a second value comprising a number of instances of any other word occurring subsequent to the first word in the subject set of member profiles;
dividing the first value by the second value.

16. The system of claim 11, wherein the storing module is to store the canonical title in a dictionary of canonical titles.

17. The system of claim 16, wherein an entry in the dictionary of canonical titles comprises a canonical title string and a count indicative of a number of raw title strings in the member profiles that have been mapped to that canonical title string.

18. A machine-readable non-transitory storage medium having instruction data executable by a machine to cause the machine to perform operations comprising:
detecting a raw title string in a subject profile, the subject profile being from member profiles maintained by an on-line social network system;
representing the raw title string as a triplet comprising a prefix, a core, and a suffix, the core including a core string, the prefix including a non-empty or an empty string, the suffix including a non-empty or an empty string;

deriving, from the core string, a canonical title, wherein the deriving comprises:
extracting one or more phrases from the core string, for each extracted phrase calculating frequency of occurrence of a phrase in respective job title fields in a subject set of member profiles from the member profiles and calculating one or more conditional probability values, the one or more conditional probability values indicative of probability of a phrase being a complete stand-alone job title, and from the extracted phrases designating a phrase as the canonical title based on frequency of occurrence calculated for that phrase and the one or more conditional probability values as compared to frequency of occurrence and one or more conditional probability values calculated for other phrases from the extracted phrases;
generating an indication of association of the canonical title with the subject profile; and
storing the indication of association of the canonical title with the subject profile in a database.

\* \* \* \* \*

UNITED STATES PATENT AND TRADEMARK OFFICE
CERTIFICATE OF CORRECTION

PATENT NO. : 9,886,498 B2  
APPLICATION NO. : 14/523357  
DATED : February 6, 2018  
INVENTOR(S) : Goel et al.

Page 1 of 1

It is certified that error appears in the above-identified patent and that said Letters Patent is hereby corrected as shown below:

In the Claims

In Column 13, Line 45, in Claim 8, delete "wing." and insert --string.-- therefor In Column 14, Line 49, in Claim 16, delete "claim 11," and insert --claim 10,-- therefor Signed and Sealed this  
Twenty-eighth Day of May, 2019

Andrei Iancu  
*Director of the United States Patent and Trademark Office*